United States Patent [19]

Speaks et al.

[11] Patent Number: 6,075,076
[45] Date of Patent: *Jun. 13, 2000

[54] COMPOSITE WOOD PRODUCTS PREPARED FROM SOLVENT EXTRACTED WOOD PARTICULATES

[75] Inventors: Jerry R. Speaks, Union; Roger O. Campbell, Federal Way; Michael A. Veal, Tacoma, all of Wash.

[73] Assignee: North American Paper Corporation, Longview, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,159

[22] Filed: Apr. 22, 1997

Related U.S. Application Data

[62] Division of application No. 08/578,991, Dec. 27, 1995, Pat. No. 5,665,798.

[51] Int. Cl.⁷ ............................................. C08L 1/02
[52] U.S. Cl. ...................... 524/14; 524/13; 162/71; 162/74
[58] Field of Search .................... 524/13, 14, 16, 524/448, 509; 530/202; 162/71, 74

[56] References Cited

U.S. PATENT DOCUMENTS

| | | | |
|---|---|---|---|
| 1,730,387 | 10/1929 | Schur et al. | 162/19 |
| 2,273,039 | 2/1942 | Hudson | 427/254 |
| 2,435,218 | 2/1948 | Hudson | 34/470 |
| 3,597,310 | 8/1971 | Sumi et al. | 162/25 |
| 3,619,351 | 11/1971 | Kolosh | 162/72 |
| 4,599,138 | 7/1986 | Lindahl | 162/19 |
| 4,776,926 | 10/1988 | Lindahl | 162/28 |
| 4,977,839 | 12/1990 | Fochtman et al. | 110/346 |
| 5,338,405 | 8/1994 | Patt et al. | 162/25 |
| 5,665,798 | 9/1997 | Speaks et al. | 524/14 |
| 5,698,667 | 12/1997 | Speaks et al. | 530/202 |

FOREIGN PATENT DOCUMENTS

| | | |
|---|---|---|
| 1105660 | 7/1981 | Canada . |
| WO 9636765 | 11/1996 | WIPO . |

OTHER PUBLICATIONS

"Paper Chemistry", Blackie Academic & International, Glasgow XP002053483, edited by J.C. Roberts; pp. 257–259.

*Primary Examiner*—Peter A. Szekely
*Attorney, Agent, or Firm*—Christensen O'Connor Johnson & Kindness PLLC

[57] ABSTRACT

Wood products of superior strength are produced from wood particulates that have been extracted with a solvent to remove volatile organic compounds and a significant proportion of pitch from the wood particulates. The products are especially resistant to weakening caused by water immersion. As a consequence of the enhanced strength and stiffness of the composites, wood products may be made thinner, and of lighter weight, for the same equivalent strength and stiffness at lower cost. The process of drying the particulate raw material and forming the composite wood products, by subjecting to heat and pressure, are virtually free from emissions of volatile organic compounds into the environment.

11 Claims, 8 Drawing Sheets

(PRIOR ART) Fig. 1.

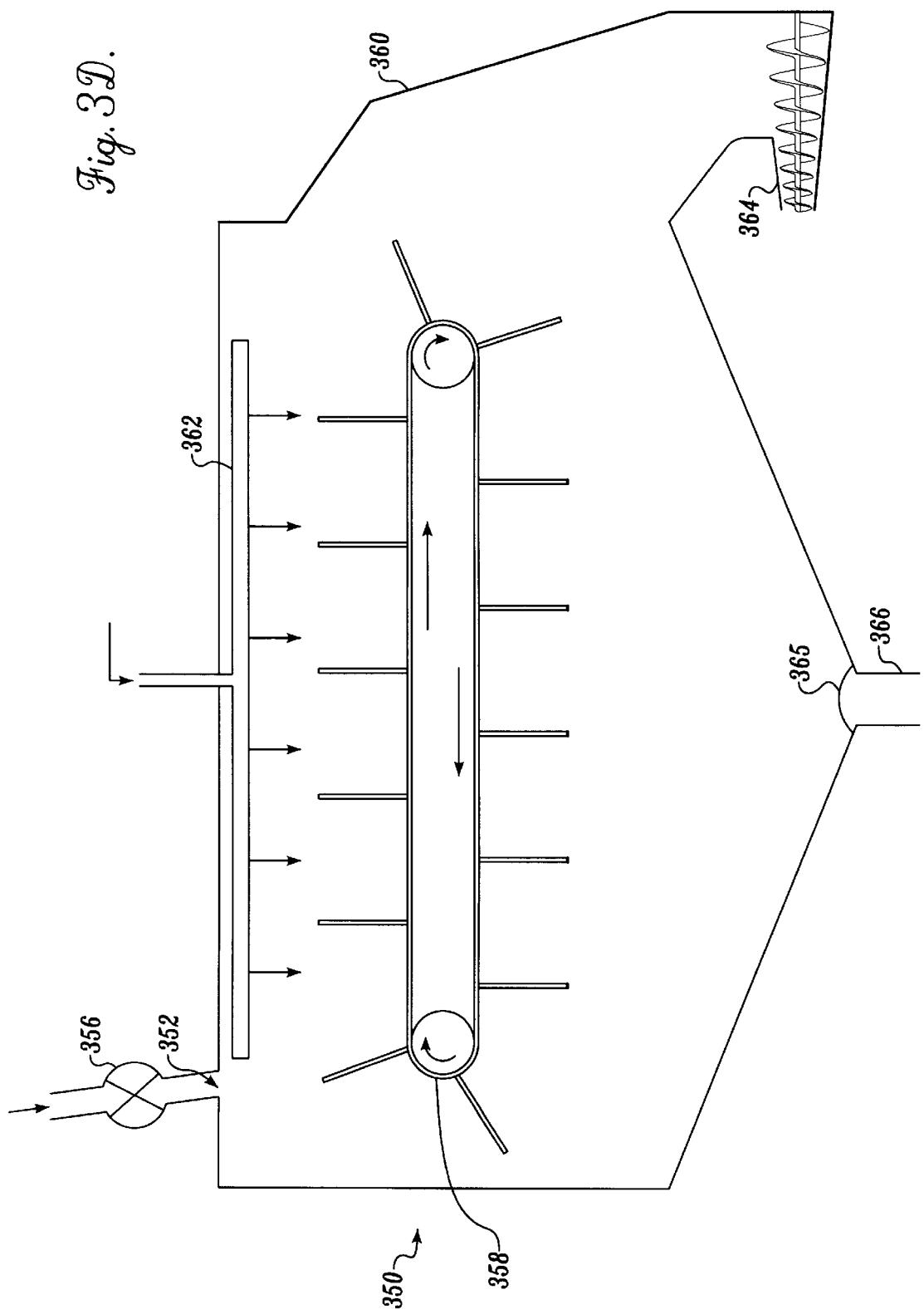

COMPOSITE WOOD PRODUCTS PREPARED FROM SOLVENT EXTRACTED WOOD PARTICULATES

This is a divisional of the prior application Ser. No. 08/578,991, filed Dec. 27, 1995, now U.S. Pat. No. 5,665, 798, and claims priority from this application under 35 U.S.C. § 120.

FIELD OF THE INVENTION

The invention provides wood products of superior strength and stiffness prepared from wood raw materials that have been subjected to an extraction process to remove volatile organic compounds and pitch components of the wood. More particularly, the invention provides oriented strand board, particleboard, and other composite wood structural products, of enhanced strength qualities made from solvent extracted wood particulate raw materials. As a result of the solvent extraction process, the process of making the wood products is virtually free of volatile organic compound emissions.

BACKGROUND OF THE INVENTION

As a preliminary matter, wood can be viewed as consisting of two major components, carbohydrates and lignin. Other components constitute a minor part of the wood and manifest as intercellular material, and extraneous substances that are related to the growth of the cells of the tree. The cell walls of the wood are composed of polysaccharides, the chief of which is cellulose. Lignin, on the other hand, is an amorphous substance, partly aromatic in nature, that has been called a "cementing material" or an "encrusting substance." It is insoluble in water and in most common organic solvents. It is also insoluble in acids, but undergoes condensation reactions in the presence of strong mineral acids. Lignin is partly soluble in alkaline solutions and is readily attacked and solubilized by oxidizing agents.

The extraneous substances of wood are deposited as cells grow, or after they reach maturity. Most of these substances are relatively simple compounds, having a low molecular weight. These low molecular weight substances include pectins, proteins, and like substances that are soluble in water or neutral organic solvents. The extraneous substances also include "wood extractives" that include pitch and volatile organic compounds.

To produce boards (oriented strand board, particle, veneer) composite wood products, and paper and pulp products, raw logs or wood fibrous material must be reduced to wood shavings, flakes, wafers, or fibers. These wood particulates are then further processed, either by bonding together with a suitable glue to make board products. However, the processing of logs into wood particulates, and thence into finished products, poses several challenges. Some of these arise from the nature of wood, namely, that it includes not only cellulosic fibers and lignin but also "wood extractives," as discussed above. These naturally-occurring wood extractives are found both in resin canals within the structure of the wood, as well as within the parenchyma cells of the wood. In general, the extractives may be divided into a higher molecular weight, higher boiling point fraction, commonly known as "pitch," and a lower molecular weight, lower boiling point fraction that falls within the definition of "volatile organic compounds." The United States Environmental Protection Agency (EPA) has determined that volatile organic compounds (VOCs) pose an environmental hazard when they are released into the atmosphere. These VOCs are defined in 40 C.F.R. Part 51(s) as "any compound of carbon, excluding carbon monoxide, carbon dioxide, carbonic acid, metallic carbides or carbonates, and ammonium carbonate, which participates in atmospheric photochemical reactions." Typically, these are volatile, low molecular weight organic compounds. The EPA has promulgated regulations limiting the quantity of VOCs that a manufacturing facility may release into the atmosphere.

The release of VOCs into the atmosphere is a long-standing problem in the industry. Since VOCs occur naturally in timber, the processing of timber into wood particulates facilitates the migration or diffusion of VOCs to particulate surfaces from which the compounds vaporize into the surrounding atmosphere. As a practical matter, after the timer has been processed into particulates, the particulates undergo a drying stage. During drying, VOCs as well as moisture are driven off from the wood particulates into the environment. It is estimated that approximately one-third of the VOCs naturally-occurring in the wood is released into the atmosphere during the drying step. Moreover, in a subsequent step wherein the wood particulates are consolidated into a composite product, by applying heat and pressure, additional quantities of VOCs are released. Thus, once the pressure on the consolidate product is released, VOCs are emitted into the environment. It is estimated that another approximately one-third of the naturally-occurring VOCs of the wood is released into the environment in this step.

As illustrated in FIG. 1, some VOCs 2' are released into the atmosphere when logs 5' are processed in a debarking and flaking operation 10' into wood particulates. These particulates are typically stored in short-term storage bins 12', sized for ensuring continuous operation of the board-making process. Wood particulates from this storage undergo a drying step 14', releasing VOCs 15' into the environment. The dried wood particulates then enter a surge bin 16', for intermediate storage before further processing. In the board manufacturing step 20', the dried particulates from the surge bin are mixed with a resin (usually in liquid form) and the mixture is charged to formers or "felters" that form the particulates onto transport belts, screens, or caul plates, for example. The caul plates are loaded into a multi-opening or continuous press and then consolidated under heat and pressure into composite products. Upon pressure release on the press, VOCs 18' are emitted into the air. This constitutes about one-third of the VOCs originally in the wood. The composite product 22' includes the residual of about one-third of the total amount of extractives.

The EPA proposes limiting the amount of VOCs that any wood particulate processing facility releases into the atmosphere by regulations requiring permits. Since a wood particulate processing facility represents a significant capital investment, operators must take steps to limit VOC emissions while at the same time ensuring that processing equipment operate at or near full capacity for an adequate return on investment. To date, methods for limiting the quantity of VOC emissions have focused on enclosing the atmosphere surrounding any wood particulate process that may release VOCs and subjecting air within the enclosure to treatment for the removal of VOCs, before release of the air into the environment. These methods require expensive equipment including large hoods to enclose equipment, fans and ducts for transporting air containing VOCs, and incinerators for combusting VOCs in the air. The methods also have high combustion fuel costs.

There exists a need to reduce or eliminate the release into the environment of volatile organic compounds from processing operations that convert wood particulates into wood products. There also exists a need for wood products of enhanced strength, particularly wet strength, for use in structural applications. With available wood supplies declining, there also exists a need for composite wood products that provide the strength and stiffness that users have come to expect, but with reduced wood content. Such composites should have the added advantage of being of potentially lighter weight.

SUMMARY OF THE INVENTION

The invention provides composite wood products of superior strength and stiffness, including superior wet cycle strength, prepared from wood particulates that have been subjected to a process for the removal of wood extractives, including a substantial portion of naturally-occurring pitch and volatile organic compounds (VOCs). As a consequence of the VOC removal, the process of making the wood products of the invention is substantially free of naturally-occurring volatile organic compound emissions.

The composite wood products of the invention include solvent extracted wood particulates bonded together with a binder into a composite structure. Since a significant proportion of the pitch has been removed from the wood particulates, it is theorized, without being bound, that a larger proportion of the surfaces of wood fibers making up a wood particulate is available to bond with the binder to form interfiber bonds with fibers of another wood particulate. This results in a stronger composite. Moreover, when the composites of the invention are subjected to moisture cycles, the enhancement in wet cycle strength, relative to prior art composites subjected to the same moisture cycles, is even greater. Strength enhancement is, to some extent, dependent upon the nature of the resinous binder. In general, the strength of composites, as measured by the ASTM D1037 standard internal bond test, increases by at least about 10% while the wet cycle strength of the invention composites, measured after an American Plywood Association D4 Standard moisture cycle, is increased by at least about 25%.

According to the invention, wood particulates are leached with an extractive solvent for VOCs and pitch. The solvent extracts the VOCs and pitch from the particulates, and is separated as a "miscella" from the leached wood particulates. The extraction preferably removes at least about 40%, more preferably from about 50 to about 100 wt %, and most preferably from about 75 to about 95% of the VOCs present in the raw wood particulates. Further, the extraction step also removes at least about 40%, preferably about 40 to 80 wt % of the pitch. The miscella, including solvent, water, VOCs, and pitch, is subjected to a separation process that reclaims the solvent for reuse. The leached wood particulates, containing solvent, are optionally subjected to a compression stage to express residual solvent. Optionally, or in combination, heat may be applied to vaporize and remove residual solvent. Any vaporized residual solvent is condensed and recycled for reuse in the extraction process. The leached wood particulates, now having substantially reduced VOC and pitch contents, are then subjected to processes for the production of composite wood products with significantly reduced emission of naturally-occurring VOCs.

The invention solves a long-standing environmental problem by virtually eliminating the release of VOCs into the atmosphere in composite wood product manufacturing processes. The removal of pitch from the wood particulates enables better bonding between wood fiber and resin binder, in the composites so that stronger wood products are produced. The better bonding permits the manufacture of lighter composites, using less wood, while maintaining strength and stiffness at levels consumers have come to expect.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying simplified process flow-type drawings, not to scale, showing important process aspects of the invention and the prior art wherein:

FIG. 3D is a schematic diagram of another embodiment of a chip extractor of the invention;

DETAILED DESCRIPTION OF THE PREFERRED EMBODIMENT

Figure 1:
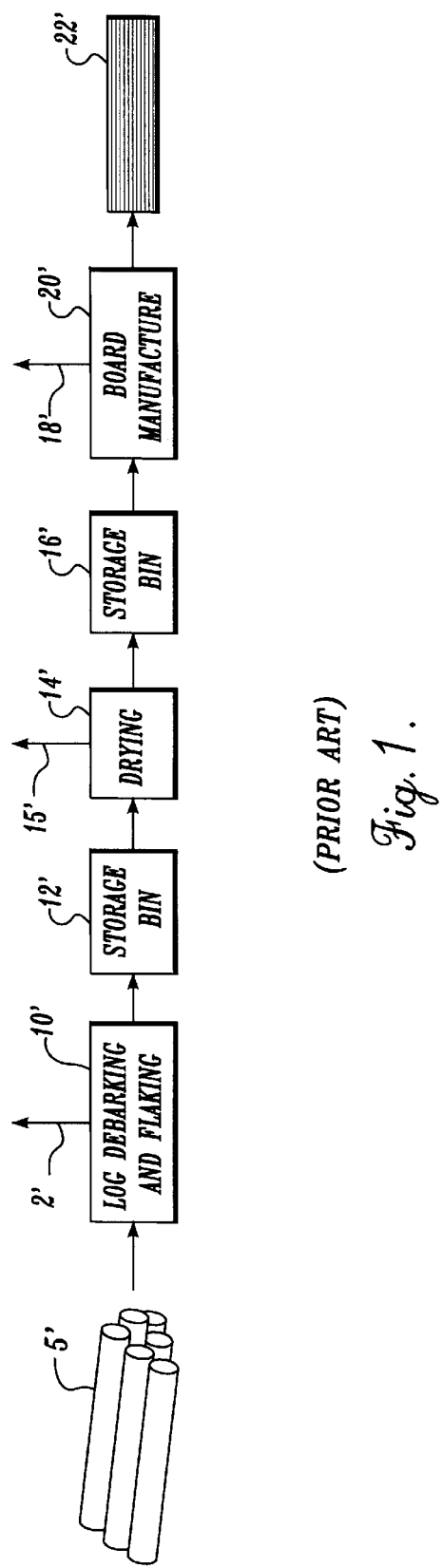
FIG. 1 is a schematic block flow diagram of wood particulate processing showing VOCs emissions in a prior art board manufacturing process.

The process of the invention uses an extractive solvent, that is either a single liquid chemical compound or a mixture of such compounds, for dissolving and removing wood extractives from wood particulates suitable for use as chargestock in pulp and paper operations or board manufacture. The term "wood particulates" refers to wood chips, sawdust, wafers, flakes, shavings, an other such solid wood in particulate form. It should be understood, that although the following descriptions may refer to only one of the types of particulates by name, the process of the invention is equally applicable to other wood particulates.

The term "wood extractives," as used in the specification and claims, refers to VOCs and pitch, and is measured as the extractives removed from wood in accordance with TAPPI Standard Test No. T204 om88, modified to use diethyl ether as the solvent. This test does not distinguish between VOCs and pitch but measures both as ether extractables of the wood. The percent wood extractives removed by the extraction process that is a step of the invention is arrived at by measuring the difference between the ether wood extractables in samples of the wood particulates before and after undergoing the extraction process of the invention.

While the specification and claims refer to VOCs and pitch as separate components of wood extractives, it is recognized that in prior art processes, not using the technology of the invention, emissions into the environment include both VOCs and pitch. Under process conditions, a proportion of non-VOC components also volatilizes and accompanies the VOCs as an emission from the process. Frequently, these volatilized wood extractives subsequently condense on process equipment resulting in equipment fouling. According to the present invention, VOCs and volatilized wood extractives are removed by extraction by the wood particulates.

The percentage of VOCs extracted from wood particulates is estimated by subjecting the extracted wood particulates to an oven heating procedure at 105° C. for 24 hours. The weight loss of wood particulates during this procedure corresponds to the residual VOCs remaining the extracted wood particulates. Similarly, the quantity of VOCs in raw wood particulates, before extraction, may be estimated by heating the particulates to 105° C. for 24 hours, and adjusting for any loss of moisture. Thus, the adjusted weight loss corresponds to the initial amount of VOCs present in the wood particulates. Accordingly, the proportion of VOCs extracted may be readily estimated from the measured amounts of VOCs present before and after extraction by the invention process. The amount of pitch resin before and after extraction may be found by difference, since the total amount of wood extractives (including VOCs and pitch) is determined by the TAPPI method, as explained above.

The term "significantly reduced pitch content" with reference to extracted wood particulates, means that at least about 40% of the naturally-occurring pitch has been extracted from the particulates. Preferably from about 40 to about 80%, and more preferably from about 45 to about 75%, of the pitch is extracted.

The term "substantially reduced VOC content" referring to extracted wood particulate means that at least about 40% of naturally-occurring VOCs have been removed by extraction, preferably from about 50 to about 100%, most preferably from about 75 to about 95%.

The term "substantially reduced VOC emissions" referring to the VOC emissions from a process means that the process operates on wood particulates that have a substantially reduced VOC content, as defined above. Thus, VOC emissions are reduced in proportion to the amount of VOCs extracted from the wood particulates.

The terms "wood composite" and "composite wood product" as used in the specification and claims refer to a consolidated wood product that includes wood particulates, a binder, and other optional additives, such as a sizing agent (wax). This consolidation may be achieved by the conventional means of applying heat and pressure, when the binder is a thermosetting resin.

Preferably, the solvent used in the extraction step of the invention is of a type that can be recycled for reuse in the process. To minimize solvent recovery costs when distillation is used in the recovery process, and to maintain the efficiency of the extraction process, it is preferred that the extractive solvent either does not form an azeotrope with water, or forms only a minimal azeotrope. In preferred embodiments, the solvent is applied to raw wood particulates that have not undergone a drying treatment to remove water, and consequently commingles with water. This process is preferred since it avoids costly drying processes. For ease of extraction, the extractive solvent should have a high affinity for wood, i.e., the solvent should readily diffuse or enter into spaces between cellulosic fibers to leach out wood extractives. To facilitate recovery and reuse of the solvent, the solvent should preferably have a physical property that allows ready separation from water, for example, a preferred solvent boils in the temperature range from about 40 to about 75° C. under atmospheric pressure conditions, to facilitate separation by distillation using steam as a heating medium. Alternatively, the solvent could boil at a temperature higher than water, although this is undesirable from an energy usage standpoint. Moreover, the solvent could be immiscible with water, as long as it is able to leach out VOCs or pitch, or both, from wood particulates.

As indicated above, the extractive solvent may include a mixture of solvents. In particular, the mixture may include a first solvent that has a particularly high affinity for saponifiable components of the extractives, and a second solvent that has a high affinity for the unsaponifiable components. As a further alternative, according to the invention, the wood particulates may be sequentially subjected to one extractive process using a solvent for the removal of saponifiable components, and another extractive process using a different solvent for the removal of unsaponifiable components. The order of these two extraction processes is not important.

The extraction step is intended to remove wood extractives such as VOCs and pitch, and not lignin. Thus, process parameters should be controlled to minimize lignin extraction or chemical attack of cellulosic wood components. Both lignin extraction and attach of cellulosic components adversely affect the integrity of the wood particulates and hence potentially reduce the strength of composites made of these particulates. It is an objective of the invention to maintain or improve composite strength while removing VOCs and pitch. Consequently, temperature, pressure an time of extraction are controlled to avoid lignin extraction and cellulose attack.

Preferably, the extraction step is carried out under as mild conditions of temperature and pressure as would require an extraction time of from about two hours to about 10 minutes, or less to minimize equipment size for a particular rate of particulates treated, in tons per hour. Most preferably, the time of extraction is about 30 minutes to about one hour for economical extraction equipment sizing. Certain solvents remove extractive at a faster rate and their leaching or solvent extraction capability is not as strongly adversely affected by increasing concentrations of extractives in the solvent. Such solvents are preferred because they potentially minimize solvent recovery costs because they can be used in smaller volumes per ton of particulates. Also, because of their faster extraction rates, less chip residence time in the extractor may be required, thereby minimizing extraction equipment size and cost.

Preferably, the mass ratio of solvent to wood particulates is in the range of from about 6:1 to about 1:1, more preferably from about 4:1 to about 2:1, and most preferably about 2:1. However, solvent:wood ratio also depends on extraction time and temperature and pressure conditions. Thus, longer extraction times require a lower solvent:wood ratio for the same degree of extraction for a particular solvent. Also, higher temperatures and pressures may allow reduced extraction time and/or solvent:wood ratios. The mass ratio of solvent:wood is measured as the total mass of solvent that a particular mass of wood will encounter in a typical extractor. Thus, even if the extractor is charged with "dirty" solvent that is recycled, without first removing all wood extractives and water, the solvent:mass ratio refers to the sum of the mass of pure make-up solvent and the mass of solvent in the dirty recycled solvent stream, relative to the mass of wood in the extractor.

Temperature and pressure conditions also impose constraints on the selection of the solvent or solvents. Those solvents that are able to effectively remove wood extractives from wood particulates, under mild conditions of temperature and pressure, i.e., conditions that do not cause significant dissolution of lignin or attack of wood cellulosic components, are useful. Thus, it is preferred, within the equipment economic size constraint mentioned above, that the extraction process operate at a temperature in the range of from about 10 to about 150° C., more preferably from about 20 to about 130° C. Preferred pressure conditions range from about atmospheric pressure (14.7 psi) to about 50 psi, most preferably from about 15 to about 25 psi. Again, the combination of temperature, pressure and time of extraction should be selected to remove wood extractives without significantly affecting yield, as discussed above.

According to the invention, solvents for the extraction of VOCs are exemplified by methylene chloride, 1,1,1-trichloroethane, 1,1,2-trichloro-1,2,2-trifluoroethane, trichlorofluoromethane, dichlorodifluoromethane, chloriodifluoromethane, trifluoromethane, 1,2-dichloro 1,1,2,2-tetrafluoroethane, chloropentafluoroethane, 1,1,1-trifluoro 2,2-dichloroethane, 1,1,1,2-tetrafluoroethane, 1,1-dichloro-1-fluoroethane, 1-chloro-1,1-difluoroethane, 2-chloro-1,1,1,2-tetrafluoroethane, pentafluoroethane, tetrafluoroethane, trifluorethane, difluoroethane, parachlorobenzotrifluoride, cyclic, branched, or linear completely-methylated siloxanes, acetate, methyl ethylketone, methyl isobutylketone, trichloromethane, ethyl ether, diethyl ether, methanol, ethanol, propanol, pyridines, hexanes, paraffins, benzene, and the like. Other solvents may also be useful. Acetone is the most preferred solvent since it forms a minimal azeotrope with water, boils at about 50° C., and has a high affinity for wood, while also being an excellent solvent for VOCs and pitch. Acetone is also favored because of its relatively low cost, low toxicity and favorable environmental classification. In a preferred embodiment, wood particulates are extracted by the method of the invention without predrying of the particulates. In this embodiment, a polar solvent or mixture of solvents or a hydrophilic solvent is preferred.

Since pitch is of higher molecular weight and includes unsaponifiable (hydrophobic) components, pitch is best extracted with a less polar solvent or solvent mixture. Preferably, the solvent or solvent mixture is hydrophobic in nature, for example, kerosene, cyclic alkanes, aromatics, such as benzene, toluene, and xylene, and the like. Most preferably, however, the solvent is acetone, in which case a single solvent may be used for the extraction of both VOCs and pitch. This facilitates recovery of the solvent by eliminating any requirement for duplication of solvent recovery apparatus.

Figure 2:
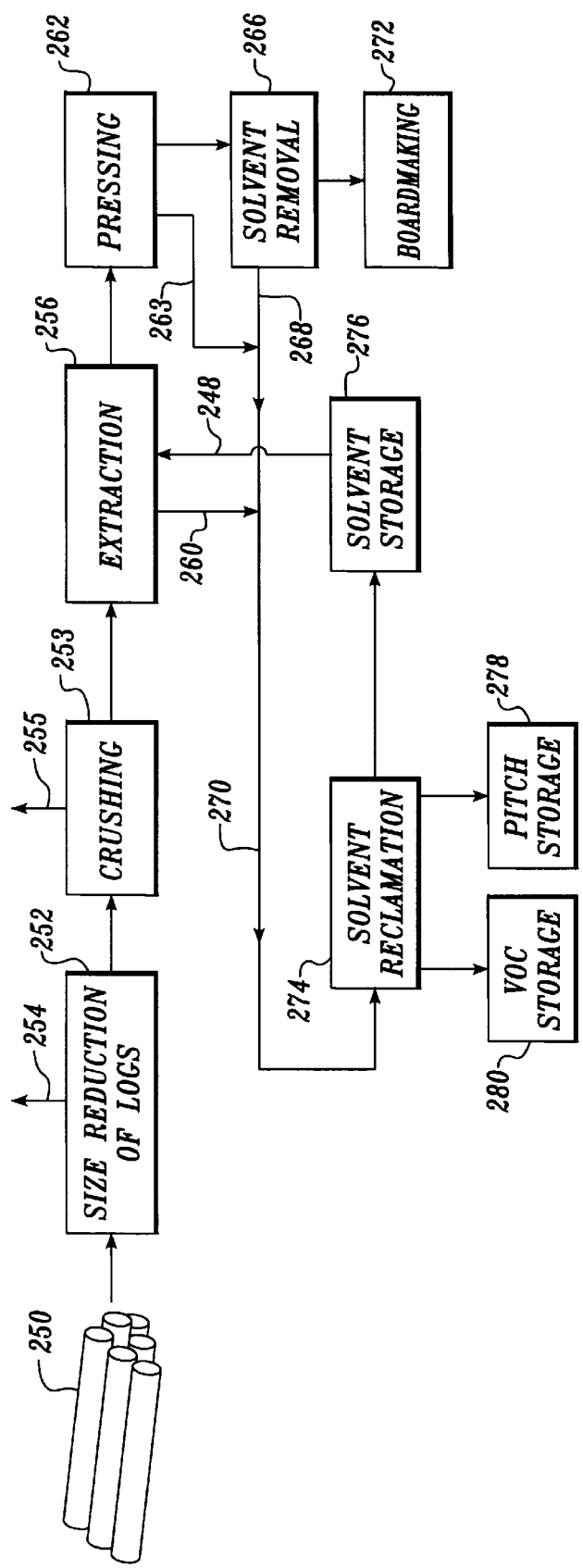
FIG. 2 is a schematic flow diagram of an embodiment of the process of the invention for VOC and pitch removal from wood chips.

For ease of understanding the process of the invention, an embodiment of the invention is illustrated in FIG. 2. As shown, raw debarked logs 250 are charged to a size reduction step 252, such as a chipper, waferizer, or refiner, and then optionally to a crushing step 253 for increase in internal surface area, if necessary.

According to the preferred method, the wood particulates are charged to an extraction operation 256 that removes pitch and VOCs from the wood particulates, along with water, depending upon the solvent used. If the solvent is hydrophilic, water may be extracted. Preferably, this process is carried out in a countercurrent operation, as shown in FIGS. 3A, 3B, 3C, and 3D. By "countercurrent" it is meant that the freshest solvent entering the extractor contacts chips that have already flowed through most of the extractive volume, and fresh particulates entering the extractor first contact solvent that has already flowed through the extractor. Ideally, in this type of flow arrangement, influent solvent containing the lowest concentration of extractable material, contacts particulates from which a proportion of the extractives have already been removed, so that the highest driving force for extraction is maintained. This driving force is proportional to the difference between the concentration of extractives in the solvent and the concentration of extractives in the wood particulates.

Figure 3A:
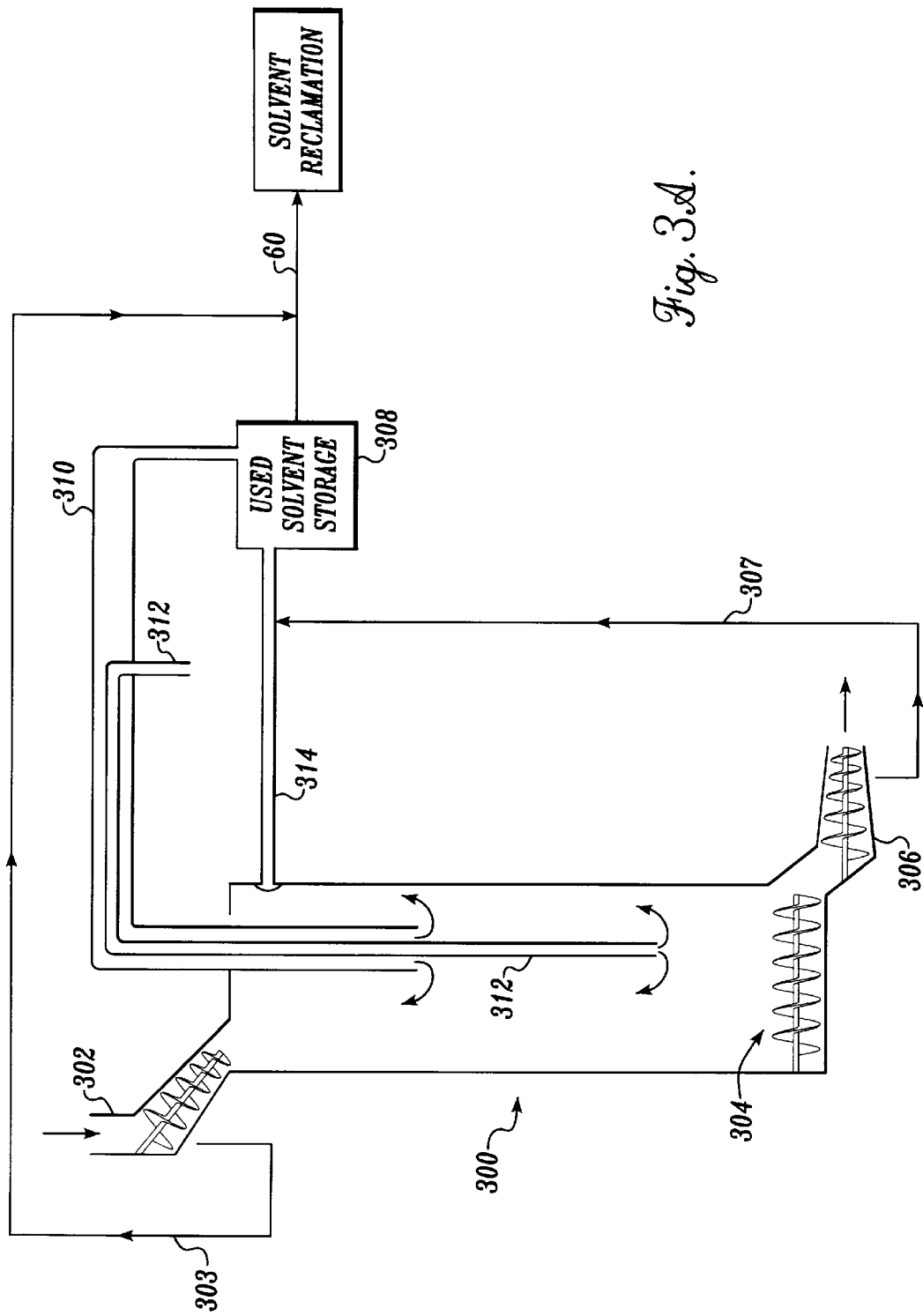
FIG. 3A is a schematic diagram of an embodiment of a chip extractor of the invention.

In the wood chip extractor shown in FIG. 3A, the extractor has a cylindrical housing 300, preferably having a length-to-diameter ratio of about 4:1. Wood particulates enter the compression screw feeder 302 that includes a progressively tapering screw thread within a sleeve. Thus, as the screw thread conveys the particulates toward the extractor, the particulates are progressively compressed in the tapering sleeve. This type of feeder is favored because it can express some water from the particulates, facilitating subsequent solvent recovery. Any water expressed in the screw feeder is drained and removed in conduit 303 and routed to VOC, pitch and solvent recovery process. The compressed particulates enter the extractor near its top and flow downward under gravitational force, and the mass of particulates continuously added to the extractor. The base of the extractor is supplied with a plurality of screw feeders 304 aligned with the longitudinal axes parallel to the base of the extractor. As these screw feeders 302 rotate about the axes, they convey the particulates towards the outlet compression screw feeder 306. During compression of the particulates in this outlet screw feeder, residual solvent is removed from the particulates. This solvent drains into conduit 307 and is routed to a used solvent storage tank 308.

In order to remove wood extractives from the particulates, solvent is added in at least two points in the extractor. In order to mimic, as closely as possible, countercurrent flow conditions, fresh solvent is injected near the base of the extractor, and "dirty" solvent that has already passed through the extractor, and that contains water and wood extractives, is injected nearer the middle or upper section of the extractor. Thus, dirty solvent is controlledly pumped from the used solvent storage tank 308 through outer concentric conduit 310 into the extractor at a location about midway along the length of the extractor. Fresh solvent is injected in innter concentric conduit 312 that terminates near the base of the extractor. Thus, as fresh solvent rises in the extractor, moving toward the exit pipe 314, it encounters particulates that have already undergone extraction with dirty solvent. Consequently, the particulates with the lowest concentration of wood extractives come into contact with solvent having the lowest concentration of wood extractives. This provides an optimum driving force for further extraction of wood extractives from the particulates. In the upper part of the extractor, entering particulates, containing naturally-occurring levels of wood extractives, first encounter dirty solvent. This dirty solvent is still able to extract wood extractives from the particulates because of the high concentration of extractives present in the particulates.

Ideally flow of solvent in the extractor is of a plug-flow type. Thus, there is little mixing between fresh and dirty solvent in the portion of the extractor below the fresh solvent injection point. Under these circumstances, the fresh solvent rises in the extractor as a "front" until it meets with upwardly rising dirty-solvent. At that point, commingling takes place and the combined solvent mass, including extracted wood extractives, rises upward through the extractor while leaching wood extractives from chips, until the solvent exits the extractor in conduit 314 and is routed to used solvent storage 308. A portion of this solvent is continuously removed and charged through conduit 60 to a solvent reclamation process.

Figure 3B:
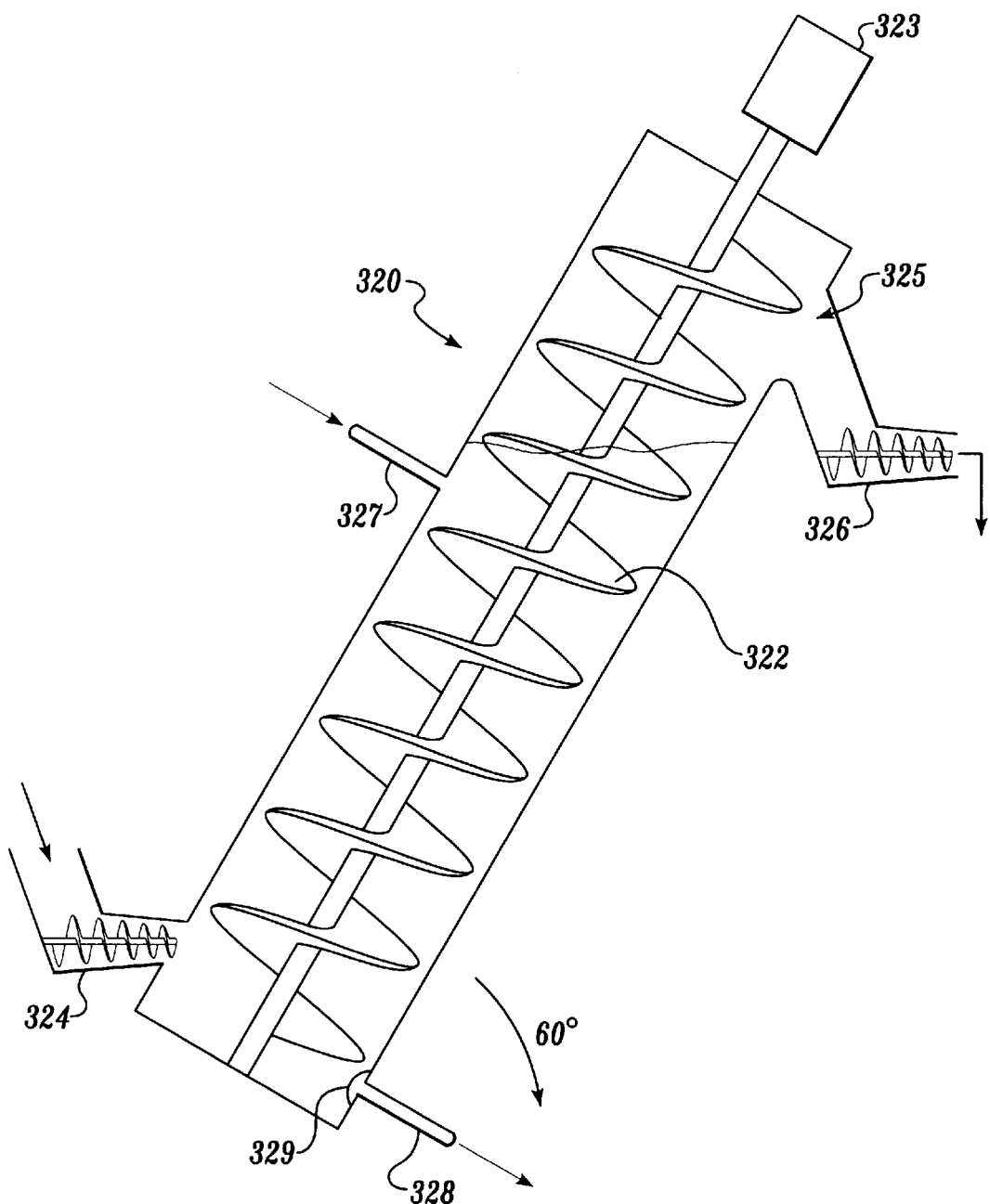
FIG. 3B is a schematic diagram of another embodiment of a chip extractor of the invention.

In an alternative embodiment of the extractor according to the invention, shown in FIG. 3B, the extractor 320 has a cylindrical body inclined at an angle of about 60° to the horizontal. The extractor is supplied with an internal screw 322 that has a longitudinal axis extending along the central longitudinal axis of the extractor and that is coupled to a drive motor 323. Threads of the screw extend outward from the root of the screw at a screw pitch angle, toward the inner surface of the extractor body 320, without touching the inner surface. Thus, the inclined screw 322 rotates, under mechanical power, within the extractor to carry entrained particulates in the spaces between the screw threads. Chips are fed into the solvent-filled extractor at an inlet near the extractor base by means of a compression screw feeder 324. These particulates are captured between the helical threads of the rotating inclined screw of the extractor and conveyed upward until they are expelled from the extractor through a particulate outlet 325 near the upper end of the extractor into an outlet compression screw feeder 326. As explained before, the outlet compression screw feeder compresses the particulates and expresses residual solvent from the particulates. In order to achieve near countercurrent conditions, acetone is injected into the inclined extractor through a conduit 327 near the top of the extractor, and removed from the extractor in an outlet conduit 328 near its base.

Figure 3C:
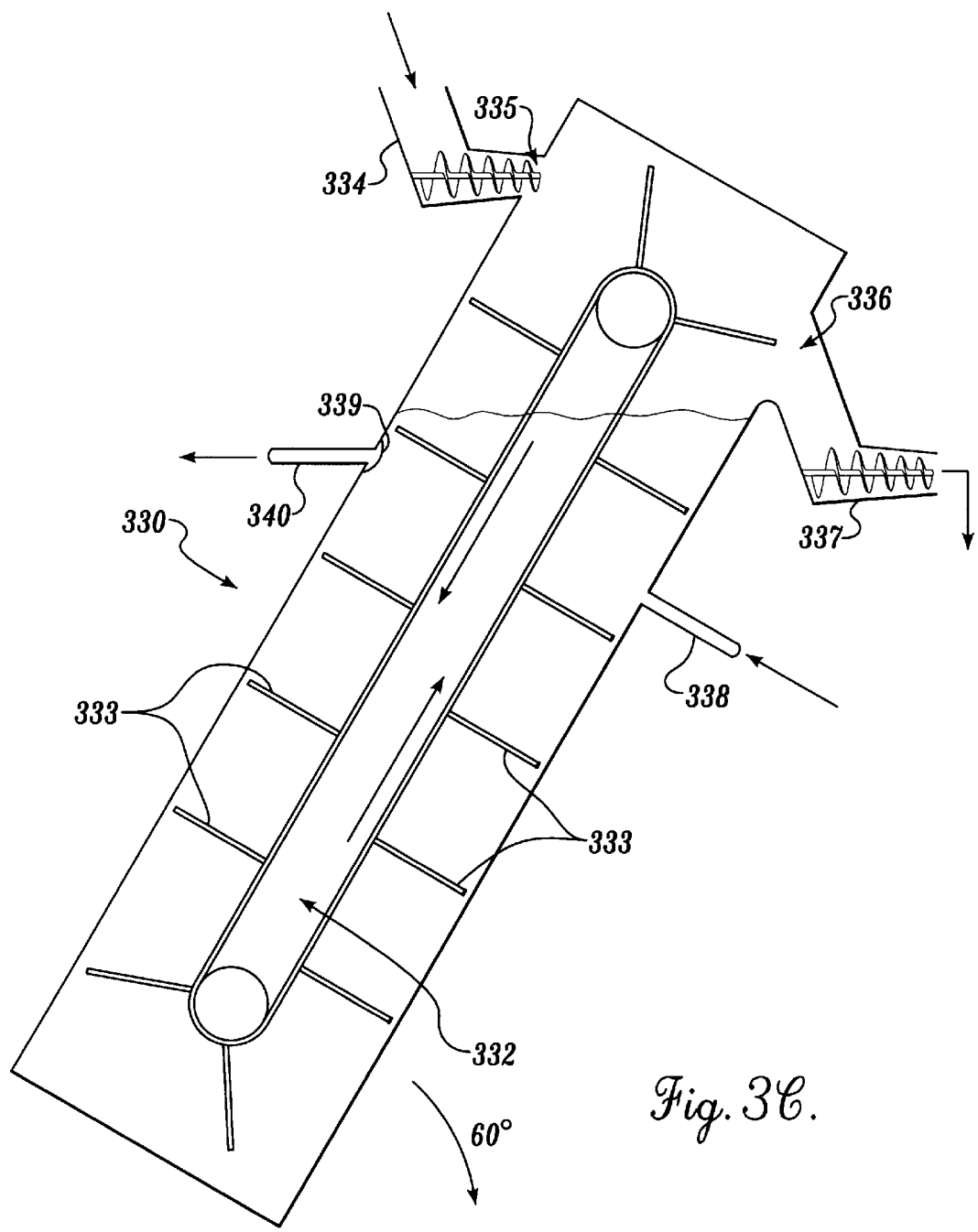
FIG. 3C is a schematic diagram of another embodiment of a chip extractor of the invention.

In yet another embodiment of the chip extractor of the invention, shown in FIG. 3C, the extractor 330 is inclined at an angle of about 60°, and is supplied with an internal pan conveyor 332. As is conventional, the pan conveyor includes an endless belt extending substantially along the central axis of the extractor. Containers, or "pans," for carrying chips are formed along the belt by planar sheets, typically of metal, mounted on, and extending at right angles from, the belt at spaced intervals. The sheets extend toward, but do not touch the internal wall of the extractor. Thus, particulates are captured in the spaces between the plates and are carried in the direction of movement of the belt. Chips are fed into the extractor inlet 335 by a compression screw feeder 334, located near the top of the extractor, on one side of the pan conveyor belt, and exit from the extractor through an outlet 336 on the opposite side of the pan conveyor belt, near the top of the extractor. The particulates are carried away in a compression screw feeder 337. Solvent enters into the extractor through a conduit 338 near the outlet of the particulates, and exits from the extractor through a conduit 340 near the particulate inlet 335. Thus, the flow through the extractor is not completely countercurrent, but approximates countercurrent conditions for at least the partially-extracted particulates on the exiting side of the pan conveyor.

In a further alternative embodiment of the chip extractor of the invention, shown in FIG. 3D, the extractor 350 is cylindrical with a vee-shaped bottom to allow drainage of solvent. Thus, particulates enter through an inlet 352 near one end of the extractor, fed by a rotary valve feeder 356. This type of feeder is an alternative that may also be substituted for the screw feeders shown at the particulate inlets of the extractors of FIGS. 3A, B and C. The particulates are carried by a centrally-mounted longitudinally-extending pan conveyor 358 toward the opposite end of the extractor while solvent is sprayed over the particulate from solvent distributor 362. The particulates exit off the end of the conveyor and fall into an exit chute 360. A compression screw feeder 364 then removes the extracted particulates for processing into pulp. The solvent is removed through a conduit 364 that has a particulate filter 365 and that is located at the base of the extractor.

As can be seen from the above, the extraction of wood extractives from wood particulates may be achieved with a variety of extractor designs of the invention. The nature of wood particulates, impose certain limitations on the nature of the equipment. Wood chips, for example, tend to interlock and form stable packed structures when placed within a container, such as an extractor, or a silo. The above-described designs overcome this tendency by providing either inclined screws, pan conveyors, or screws near the base of the extractor to facilitate particulate movement in the extractor and chip removal from the extractor. The designs, especially those of FIGS. 3B, 3C and 3D, also reduce channeling of wood chips from inlet to outlet of the extractor and facilitate control of particulate residence time in the extractors.

Referring to FIG. 2, in the extraction stage 258, described above with reference to exemplary extractor embodiments, the wood particulates are immersed in the extraction solvent supplied in conduit 248 from solvent storage 246. Mild agitation, while preferred, is not necessary. During the immersion, solvent surrounds and penetrates the wood particulates dissolving and leaching wood extractives, including VOCs and pitch, from the structure of the wood particulates. Preferably, the solvent penetrates into and removes extractives from the resin canals of the wood as well as the parenchyma cells of the wood. This removal or "leaching" of extractives from the wood takes place under conditions of temperature and pressure that do not cause substantial attack of the cellulosic component of the wood. Thus, the high temperatures and pressures used in prior art processes designed to delignify wood or to pulp wood using solvents (often in combination with catalysts) are not employed. Instead, the integrity of the cellulosic component is maintained as wood extractives are leached out. Moreover, the lignin component of the wood is also not affected, or only significantly affected, so that the wood particulates are not pulped. Only removal of a sufficient proportion of extractives to substantially eliminate subsequent VOC release from the leached wood chips and to eliminate the need for pitch-scale treatment chemicals in subsequent pulping operations, is required according to the invention. In certain instances, external heat may be supplied to facilitate leaching. Moreover, in certain instances, pressure may be applied in the extraction process to prevent vaporization of the solvent. However, in the preferred embodiment using acetone as a solvent, external heat is not needed, nor need pressure be applied. Thus, the leaching or extraction takes places at ambient conditions of temperature and at about atmospheric pressure.

The extracted wood particulates are separated from solvent in the extract(s) and transported to optional particulate pressing operations 262 for removal of residual solvent and extractives, for instance in screw presses. The solvent, containing water, pitch and VOCs, now called a "miscella" is removed in conduit 260 for processing to recover solvent for reuse, and pitch and VOCs for sale or combustion.

In the optional screw presses, the extracted wood particulates are subjected to mechanical pressure causing squeezing and compression of the particulates. As a result, residual solvent containing pitch is expressed from the particulates. This liquid is conveyed in a conduit 263 to the solvent and pitch recovery processes, as will be described later. The compressed wood particulates, still containing some residual solvent, are charged to a solvent removal stage 266.

Solvent removal may be effected by conventional means, such as charging to a rotary drum dryer, or continuous dryers that comprise a multiplicity of drying stages enclosed in a housing and subjected to hot air and/or steam that removes solvent from a substrate to be dried. To facilitate drying, the air should be preheated to at least the boiling point of the solvent. Solvent vapors removed during this stage are carried by conduit 268 in the air stream to processes for solvent recovery. The substantially solvent-free leached and dried particulates, with reduced VOC and pitch content, are charged to a boardmaking process 272. As a result of the extraction of VOCs and pitch, in the process of the invention, VOC emissions during the boardmaking operations are significantly reduced. Interparticulate bonding strength is improved due to pitch removal so that board quality is also enhanced.

In an important aspect of the invention, the extractive solvent used in the VOC and pitch extraction stage is recovered and recycled for reuse. As shown in the illustrative embodiment of FIG. 2, liquid streams 260, 263 and 268 containing solvent, from extractor(s) 256, optional particulate pressing 62, and solvent removal 266, respectively, are gathered in header 270 which charges the solvent-containing fluids to a solvent reclamation stage 274.

In the solvent reclamation process, the solvent is separated and routed to solvent storage 276 for reuse in the process of extraction. Preferably, about 95 to 98%, or more, of the solvent is reclaimed and recycled. The reclamation step also produces a VOC product, that may be stored in VOC storage 280 for sale or use as a fuel, and pitch product that may be stored in pitch storage 278 for sale or use as a fuel.

The volatile organic compound product produced, and the pitch product produced, are not necessarily "pure." Rather, the VOC product may contain at least some, although minimal, amount of solvent, as well as water. The pitch product will contain pitch as well as water. Pitch by itself solidifies at room temperature and is difficult to handle. While the pitch may be spray-dried into pellets for handling, it is preferred that the pitch product contain less than about 50 wt % solids so that it may be maintained in a liquid stage, either at ambient temperature or with the addition of economically minor amounts of heat or waste heat. This liquid pitch product is more readily pumped into heated tank cars for sale.

The above-described extraction process removes a significant proportion of the pitch from the wood particulates. As explained before, it is theorized that the pitch that interferes with composite bonding (bonding between fibers of different particulates) is the pitch found on fiber surfaces. Consequently, the invention requires, at a minimum, the removal of only a proportion of this "fiber-coating" pitch to allow composite strength improvement. The pitch present internally in the wood particulate is of little consequence with respect to bond strength enhancement. Consequently, reference in the specification and claims to the removal of a "significant proportion of the pitch" refers to the removal of a significant proportion of the pitch that forms surface coatings on those fibers near the surface of the wood particulates that would otherwise be available to bond with a binder and then to fibers of another wood particulate. Therefore, to obtain the advantages of the invention, only about 30% of the total ether extractable pitch need be removed. Preferably, however, from about 40% to about 80% of the pitch is removed.

The extracted wood particulates, now having a substantially reduced pitch content, and substantial reduced volatile organic compound concentrations, are placed in intermediate storage for subsequent processing. Extracted wood particulates are removed from intermediate storage and charged to an optional drying step, depending upon the residual moisture content of the particulates. The preferred moisture content varies with the nature of the composite product. In certain products, it is preferred that the moisture content should be no more than 10 wt %, while for other products, the moisture content is preferably less than about 3 wt %. The drying step, if needed, is carried out on conventional equipment.

In general, the extracted wood particulates having the desired moisture level, whether chips, sawdust, or wood flakes, are dosed with a controlled amount of a binder that is sufficient to allow subsequent consolidation of the wood particulates into a structural wood product, such as a board. Typically, the binder is a thermosetting resin, or a solution of such resin, for example, urea formaldehyde, or other such resin that has an affinity for bonding to cellulosic fiber and that thermosets under the conditions of temperature and pressure normally used to consolidate wood composites. The dosed wood particulates are charged to a former. A conveyor belt carrying caul plates passes beneath the former so that resin-dosed wood particulates can be poured onto successive caul plates to a predetermined weight. The caul plates are then loaded into a multi-opening press where pressures ranging from about 300 to about 600 psi, and temperatures in the range of from about 150 to about 220° C., are applied to consolidate the wood particulates into a unitary construct. In sharp contrast to the prior art, the consolidation operation has significantly reduced emissions of volatile organic compounds. In the prior art, when pressure is released in the press, and the constructs are removed, large quantities of vaporized VOCs are emitted into the surrounding atmosphere. However, since a substantial proportion of these naturally-occurring wood extractives are removed from the wood particulates, in accordance with the invention, such VOC emissions are substantially reduced, or eliminated. After the pressing operation, the formed construct is cooled by natural convective cooling.

Figure 4A:
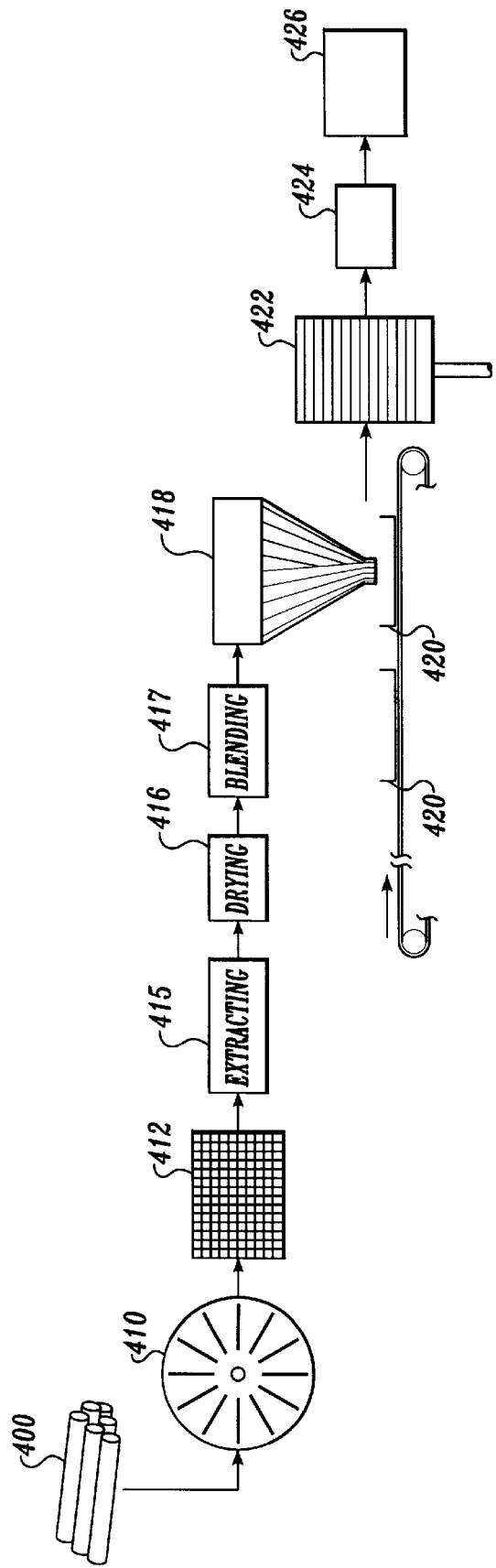
FIG. 4A is a schematic diagram of an embodiment of a process for the manufacture of oriented strand board according to the invention.
Figure 4B:
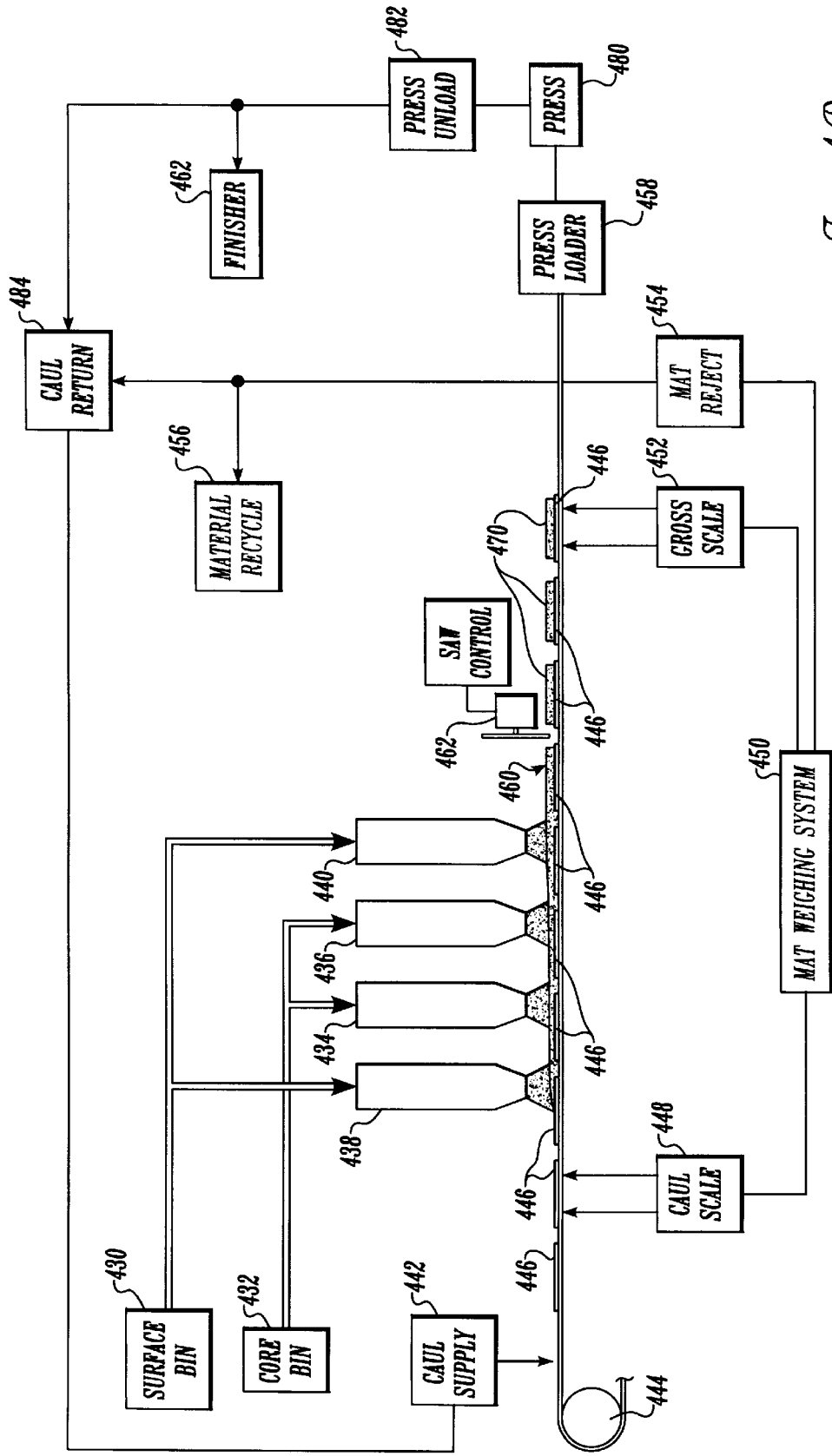
FIG. 4B is a schematic diagram of an embodiment of a process for producing particleboard in accordance with the invention.

FIG. 4A illustrates a process for producing oriented strand board, in accordance with the invention. Debarked logs 400 of a desired length, typically having a moisture content of from about 40% to about 70%, are fed to a waferizer 410. The waferizer cuts the logs into thin wafers having a thickness of from about 0.010 to about 0.060 inch, and a length of from about 40 to 1200 times this thickness or more, in the direction of the wood grain. The width of the wafer is typically from about 5 to about 60 times the thickness. These wafers are passed through a screening apparatus 41, to remove any fine particles of wood. At this stage, the wafers are routed to an extraction process 415, as explained above with reference to FIGS. 2, and 3A–D, for removal of wood extractives. Extracted wood particulates, having reduced VOC content and reduced pitch content, are then dried in drier 416, without significant emission of VOCs that originate naturally from the wood, before being charged to a blender 417 where they are mixed with wax in molten or emulsified form and a bonding resin.

The mixture of flakes, wax, and resin is then directed to a felter or "former" 418 where it is felted into mats of uniform mass on caul plates (or transport belts or screens) 420 carried on a conveyor belt so that sequential caul plates may be filled in an automated system. The felter orients wafers so that they may be laid in a pattern in the mat. Thus, a first (bottom) layer may have wafers aligned in a first direction, second and third layers aligned in a direction at a first angle to the first direction, and a fourth (top) layer aligned in the first direction. This orientation of the layers strengthens the resultant product. These plates are stacked in a multi-opening press or continuous 422. When the press is filled with plates, the press is closed and the plates are subjected to heat and pressure for a sufficient time to consolidate the flakes into oriented strand board 424. During the application of heat and pressure, the resin cures so that it binds the wood flakes to each other to form a composite board. After consolidation of the wood flakes, pressure on the press is relieved, substantially without the emission of VOCs that occur naturally in wood. The boards are removed from the press, and stored in stacks 426. Thereafter, the boards are cut to the desired dimensions for sale.

Processes for manufacture of other types of boards, such as particleboard, are generally similar to the above-described oriented strand board manufacturing process U.S. Pat. No. 4,038,531 describes a controlled particleboard manufacturing system, and is hereby fully incorporated by reference. Extracted wood particulates, according to the process of the invention described above, are supplied to two different bins: a surface bin 430 and a core bin 432. The core bin supplies wood particulates to formers 434 and 436, while the surface bin supplies particulates to formers 438 and 440. In this manner layered particleboards may be produced with certain desired properties, such as for instance appearance-enhanced surfaces and high strength cores. A caul plate supply 432 provides caul plates on to a conveyor belt 444 so that plates 446 are placed at intervals on the conveyor belt. As part of a mat weighing system 450, each caul plate first passes over a caul scale 448 in communication with a mat weight system 450. A substantially continuous mat 460 is produced by wood particulates poured at controlled rates onto the moving caul plates on the conveyor belt. A saw 462, operating under automatic control, trims the continuous mat 460 to the desired length, removing any excess material from the caul 446 so that a mat 470 of desired length and width remains on the plate. The plate and its mat then pass over a gross scale 452 in communication with a mat weighing system 450 where gross weight is measured. The mat weighing system determines the mass of the mat from the difference between the gross scale reading and the caul plate mass. If the mat is outside a specific range of weights, the mat weighing system activates a mat reject system 454 that removes the caul plate and mat from the system so that the wood particulates are sent to material recycling 456 and the caul plate is returned to the caul return system 484 for redirection to the caul supply system. Those mats that meet requirements are directed to a press loader 458 and thence are loaded into a press 480. Once the press is filled with caul plates, pressure and heat is applied to consolidate the mat on each caul plate into a composite particleboard. Upon release of pressure and heat, particleboards may be removed in press unloading 482, with a substantial reduction in the emission of VOCs that naturally occur in wood. The resultant particleboards are then trimmed to size by a finisher 462 and placed in inventory for sale.

While the above description relates specifically to the manufacture of board products, it is clear that other composite products may also be produced from extracted wood particulates. Such products maybe produced by processes that include the steps of mixing the wood particulates with a suitable binder, pouring the wood particulate/binder mixture into a suitable mold, and subjecting the wood particulate/binder mixture in the mold to heat and pressure, without significant emission of naturally-occurring VOCs (or with substantially reduced VOC emissions), to cause consolidation into the desired composite wood product.

As explained above, in the process of the invention, because the wood particulates have been extracted to remove a substantial portion of the volatile organic compounds, the drying and consolidation operations have substantially reduced emissions of VOCs that naturally occur in wood. Furthermore, since the invention removes a significant proportion of the pitch from wood particulates, wood fiber surfaces are substantially free of pitch contaminants, thereby facilitating bonding to the thermosetting binders. As a result, stronger wood products are produced. This enhancement of strength is particularly marked when strength is tested after the wood product has been immersed in water. The wood composites also have enhanced stiffness.

According to the invention, as a result of the superior strength of the wood composite products, composites may be made thinner or lighter, or both, yet provide the same strength and stiffness as prior art composite products. Alternatively, wood products of the same dimensions as prior art products may be produced, to provide enhanced strength and stiffness properties and potentially greater longevity. In general, the strength of composites made in accordance with the invention, as measured by ASTM D1037, increases by at least 10%, relative to composites made with particulates containing naturally-occurring levels of pitch. Preferably, the strength of the composites increases by from about 10 to about 95%, or more, Likewise, the wet cycle strength (American Plywood Association D4 Moisture Cycle) of the composites of the invention is at least about 25% better than the wet cycle strength of composites made from particulates containing naturally occurring levels of pitch. Preferably, the wet cycle strength of composites according to the invention increases by from about 35 to about 150%.

The process of the invention removes volatile organic compounds from wood particulates thereby allowing processing of these wood particulates without the release of VOCs into the environment. Moreover, the process of the invention removes pitch from wood particulates thereby facilitating further processing of the wood particulates into enhanced composite products. Further, the invention provides two additional useful products, namely, VOCs and pitch, that may be sold as byproducts or used as fuel, thereby enhancing the economics of the process of the invention.

The following examples are illustrative of aspects of the invention and do not in any way limit of the scope of the invention, as described above and claimed here below.

EXAMPLES

Example 1

Comparison of Solvents for the Removal of Wood Extractives

A series of solvents were tested to determine which was most effective for the extraction of wood extractives, including volatile organic compounds and pitch. In each of the tests, 50 gram batches of oven dried Lodgepole Pine wood chips were extracted with solvent at a solvent:wood mass ratio of 4:1. Samples of each batch were each analyzed for wood extractives, using a modified TAPPI test method T204 om88 with diethyl ether as the extraction solvent, before and after extraction with the test solvents.

In each case, the batch of wood chips was subjected to a batch extraction process. The wood chips were not predried, so that their condition approximated that of wood chips normally received for treatment in a wood pulping facility, or used in a composite wood product manufacturing facility. The wood chips were preheated with atmospheric steam for 30 minutes. During this time, the wood chip temperature rose to about 95° C. The wood chip batch was then immediately submerged in the extraction solvent. In each case, the solvent:wood ratio was 4.0 and the extraction time was 30 minutes. After extraction, solvent was drained from the chips, and the chips were subjected to a second heating cycle of 30 minutes with atmospheric steam. Thereafter, the chips were subjected to a second extraction cycle using the same solvent at the same solvent:wood ratio. After draining solvent from the chips, the chips were analyzed to determine the amount of residual wood extractives. The percent wood extractives removed was calculated for each batch and the results are reported in the accompanying Table 1.

Example 2

Process Conditions for the Removal of Wood Extractives

A series of acetone extractions were conducted to determine conditions suited for the efficient removal of wood extractives. In each case, a 50 gram batch of oven dried wood chips was treated in a solvent:wood ratio of 4.0. The wood chip species evaluated were Ponderosa Pine (PP) (seven batches) and Douglas Fir (DF) Four batches) and a PP control batch. During the extraction processes, steam preheating time, acetone extraction time, and post-steaming times were varied. Steam was supplied at ambient pressure, and the extractions were carried out at ambient temperatures and pressures. In each case, the extracted wood chips were finally squeezed in a press at 1500 psi for 5 minutes. A modified TAPPI test method, T204 om88, using diethyl ether as the extraction solvent, was used to determine the percentage of wood extractives removed from the samples. The results are shown in Table 2.

TABLE 2

|  | Steam #1 | | | Extraction #1 | | Steam #2 | | | Extraction #2 | | Press | Extraction |
| --- | --- | --- | --- | --- | --- | --- | --- | --- | --- | --- | --- | --- |
| time, minutes | 0 | 15 | 30 | 15 | 30 | 0 | 15 | 30 | 15 | 30 | 5 | % |
| PP1 |  |  |  | X |  |  |  |  |  |  | X | 62.5 |
| PP2 |  | X |  | X |  |  |  |  |  |  | X | 48.6 |
| PP3 |  | X |  | X |  |  |  |  |  |  | X | 53.3 |
| PP4 |  |  |  | X |  |  |  |  | X |  | X | 64.6 |
| PP5 |  | X |  | X |  |  | X |  | X |  | X | 58.5 |
| PP6 |  |  |  |  | X |  |  |  |  | X | X | 78.2 |
| PP7 |  |  | X |  | X |  |  | X |  | X | X | 73.0 |
| Control PP |  |  |  | H₂O |  |  |  |  |  |  | X | 17.6 |
| DF |  |  |  | X |  |  |  |  |  |  |  | 48.5 |
| DF |  |  |  | X |  |  |  |  |  | X |  | 53.6 |
| DF |  | X |  | X |  |  | X |  | X |  |  | 54.2 |
| DF |  |  | X |  | X |  |  | X |  | X |  | 57.4 |

From the above table, presteaming with atmospheric steam did not appear to enhance extraction. Indeed, presteaming appears to reduce extraction. While multi-stage extractions show slight increases in overall extraction, this increase may not justify the additional equipment required in a commercial operation. Increasing the extraction time, in a single- or multiple-stage extraction, is effective in increasing the percent wood extractives removed.

TABLE 1

| Treatment Solvent | Percent Extraction |
| --- | --- |
| Peracetic Acid | 45.8 |
| Caro's Acid | 14.2 |
| Hypochlorous Acid | 37.5 |
| Deionized Water | 41.0 |
| Acetone/Water 80/20 | 54.4 |
| Acetone 100% | 65.0 |

These results indicate that acetone is the best solvent for the removal of wood extractives from Lodgepole Pine. Acetone has advantages over the use of an 80/20 acetone/water mixture, and is also superior to the other solvents tested. It is theorized, without being bound, that oxidized acids (or alkaline reagents), depend upon chemical reactions that convert wood resins in order to achieve extraction. Not only is this from a thermodynamic perspective not as effective as direct solution of the extractives in an organic solvent, but alkaline extractions have several disadvantages. These include the darkening of wood fibers which would result in higher fiber bleaching costs. Moreover, the nonselective nature of caustic treatments results in loss of yield. Also, caustic extracts are extremely toxic and costly to treat.

Example 3

Variation of Percentage of Wood Extractives Removed with Extraction Time, Using Acetone as a Solvent A batch of Lodgepole Pine chips was sampled and tested as described in TAPPI T204 om88, modified to use diethyl ether as a solvent, to ascertain the amount of wood extractives in the chips. Then, samples of the chips were each treated with acetone for 3, 5, 10, and 20 minutes, respectively. Each extracted chip sample was then air dried, ground to 1 mm size particulates, and extracted in the same modified TAPPI method to determine residual wood extractives. The percent wood extractives removed was calculated for each extracted sample and the results were tabulated in Table 3.

TABLE 3

| Time of Extraction (min) | Ether Extractables (wt. %) | Extraction (%) |
| --- | --- | --- |
| 0 | 2.9 | 0 |
| 3 | 2.3 | 21 |
| 5 | 1.9 | 35 |
| 10 | 1.5 | 48 |
| 20 | 0.75 | 74 |

The results show that wood extractives were reduced from 2.9% in the raw Lodgepole Pine chips to 0.75 wt. % in 20 minutes. This represents an extraction of about 75% of the wood extractives. Moreover, after only 5 minutes, 35% of the wood extractives have been removed. Tests indicated that volatile organic compounds were virtually completely removed from the chips, even after only 5 minutes. Thus, longer extraction time is only needed if it is desired to remove increasing quantities of pitch. It is theorized, without being bound, that lower molecular weight wood extractives are more soluble and are therefore extracted as a faster rate than the higher molecular weight components. Consequently, VOCs are first removed, followed by those wood extractives that are likely to become volatilized under wood chip pulping conditions, and composite board making conditions. Therefore, extraction need only proceed to remove these components, unless higher molecular weight, less soluble pitch must also be removed for other purposes.

Example 4

Comparison of Alternative Solvents for the Removal of Wood Extractives

A series of wood chip extractions were conducted with organic solvents to determine their relative ability to leach extractives from wood. The solvents include methanol, ethanol, 2-propanol, methyl iso-butyl ketone, hexane, acetone, and water.

Samples of raw Lodgepole Pine wood chips were each extracted according to TAPPI T204 om88, modified to use diethyl ether as a solvent, to determine initial wood extractives content. In a first comparison, batches of wood chips were each extracted with a specific solvent, at its boiling point, for either 20 or 4 hours, respectively. The extracted wood chips were then air dried, ground to 1 mm size, and again extracted with diethyl ether, in the modified TAPPI test method T204 om88, to determine residual wood extractives.

A second set of wood chip samples were first air dried, then ground to 6 mm particle size, before being extracted for 4 hours at the solvent boiling point. Thereafter, the extracted wood particulates were ground to 1 mm size, and extracted with diethyl ether, as above, to determine residual wood extractives.

Finally, samples of wood meal were also extracted with each solvent for 4 hours at the solvent boiling point to determine the limit of wood extractives removal achieveable with the particular solvent. The percentage of wood extractives removed in each extraction was calculated and the results are tabulated in Table 4.

TABLE 4

| | Extraction, % | | |
| --- | --- | --- | --- |
| Solvent Sample Type | 20 minute Reflux chips 6 mm | 4 hour Reflux chips 6 mm | 4 hour Reflux wood meal |
| Methanol | 68 | 75 | 95 |
| Ethanol | 62 | 73 | 96 |
| 2-Propanol | 66 | 75 | 94 |
| Acetone | 67 | 75 | 96 |
| Methyl Isobutyl Ketone | 41 | 70 | 96 |
| Hexane | NA | 18 | 86 |
| Water | 21 | 17 | 38 |

As can be seen from the above table, the hydrophilic solvents appear to be superior to the hydrophobic solvent, hexane, as an extraction solvent. Moreover, percent extraction increases with time of extraction, although the increase is small relative to the increase in time required. Methanol and acetone appear to be the best solvents. However, methanol poses toxicity issues.

Based on the percentage extraction achieved with wood meal, the practical upper limit of wood extractive removal appears to be about 95%. However, as explained before, virtually all volatile organic compounds will be removed, and the residual wood extractives are expected to comprise only the higher molecular weight, and specifically, more hydrophobic, wood extractive components.

Example 5

Determination of the Effect of Wood Particle Size and Handling Conditions on Removal of Wood Extractives In order to test the effect of particle size, wood chips were treated in equipment that would either (1) reduce average particle size or, (2) cause fractures in the wood chips opening internal surfaces and reducing average chip thickness. A batch of chips was treated with a Rader DynaYield Chip Conditioner, designed to squeeze those wood chips that have a thickness greater than 1.5 mm. In this conditioner, the greater the thickness of the charged wood chip, the more work is applied to the wood causing delamination along the wood grain. In effect, this reduces the apparent particle thickness without significantly decreasing chip size or integrity.

Another batch of chips was treated in a Prex screw press. This equipment causes a larger size reduction. However, it is also known that the quality of pulp produced from chips treated through a screw pass, or like equipment, such as the Sprout-Bauer Pressifine, French Oil Press, and Prex screw is minimally affected.

A sample of the wood chips was extracted using TAPPI T204 om88 test method, modified to use diethyl ether as a solvent, to determine the percent wood extractives present. Those chip batches treated in the Rader Chip Conditioner and the Prex screw feeder and a control batch were each separately extracted with acetone, under the same conditions of concentration, solvent:wood ratio, temperature and pressure. A sample of the extracted chips was again analyzed by the TAPPI method to determine residual wood extractives. The percentage of wood extractives removed was calculated. The results are shown in Table 5.

TABLE 5

| Wood Chip Size | Control Chip | Rader Conditioner | Prex Screw |
| --- | --- | --- | --- |
| Over Thick >10 mm | 60% | 72% | — |
| <10 mm | 58% | 78% | 84% |
| <6 mm | 65% | 67% | 88% |
| Pins | 82% | — | — |
| Fines | 91% | — | — |

As shown in the table, treating chips in a Rader condition allows some increase in the removal of wood extractives, especially for larger size wood chips. This is to be expected, since fracturing the larger wood chips allows better penetration of the solvent into the interior of the chip.

The effect of increased extraction is even greater with chips treated with the Prex Screw equipment. Again, this is explained by the greater degree of size reduction and fracturing of the chips that is achieved with this equipment that facilitates penetration by the solvent into the chip and removal of wood extractives.

Example 6

Solvent Extraction of Wood Flakes and Effects on Composite Panel Properties A 25 lb. oven dried batch of Loblolly Pine wood flakes was placed in a 55 gallon polyethylene drum. To this was added 100 lbs of acetone. The drum was sealed and the mixture was mildly agitated by rolling the drum on its side every 5 minutes for a total of 30 minutes. After extraction was complete, the miscella was drained off and collected for later analysis. The extracted flakes were allowed to drain for about 10 minutes, then poured onto plastic sheeting for air drying. The air dried flakes were then packaged, placed in cold storage, and later analyzed.

Three test panels, each 20 inches×20 inches in measurements were made from the extracted wood flakes, using urea formaldehyde (UF), phenol formaldehyde (PF), and methyl di-isocyante (MDI) resins, respectively. Control panels were also made with each of these resins, for purposes of comparison. The panels made of extracted wood flakes, and the control panels, were each tested for dry internal bond (by ASTM D1037), and internal bond after a moisture cycle, according to an American Plywood Association D4 moisture cycle. These results are reported in Table 6A below.

TABLE 6A

| | Dry Internal Bond | | | Internal Bond After a Moisture Cycle | | |
| --- | --- | --- | --- | --- | --- | --- |
| Resin Type | Control (psi) | Treated (psi) | % Improved | Control (psi) | Treated (psi) | % Improved |
| Phenol Formaldehyde | 43.5 | 71.6 | 65% | 10.3 | 23.6 | 129% |
| Methyl Di-Isocyanate | 92.5 | 102.0 | 10% | 14.6 | 21.2 | 45% |
| Urea Formaldehyde | 44.0 | 86.0 | 95% | N/A | N/A | N/A |

Regardless of resin, the dry internal bond strength increased relative to the control when extracted wood flakes were used. Indeed, the extracted composites showed improvements in strength of up to 65% for PF and 95% for UF. Moreover, after the boards had been subjected to a moisture cycle, the improvement was even more marked, especially for PF resin, showing an improvement of about 130%.

The consistent improvement in internal bond strength, and bond strength after a moisture cycle, suggests that the extraction of pitch and other acetone-soluble materials alters the ability of the wood to bond to the resin. It is theorized, without being bound, that the extraction process improves bonding by removing wood extractives that interfere with resin/wood bonding, or that the solvent alters the wood fiber surfaces in some manner to enhance wood/resin interaction. As a result of the observed increased bond strength, the proportion of resin in wood composites may be reduced as a cost-saving measure to maintain the same strength as achieved in the control. Alternatively, the amount of resin may be manipulated to achieve a range of products of enhanced strength.

In an important aspect of the invention, the solvent (in this case acetone) must be reclaimed and recycled for use. Since flake size and condition is important in the manufacture of oriented-strand board, the flakes were not pressed to express any residual acetone. Nevertheless, the recovery of acetone was about 98%, even though extraction was carried out in an open system, as shown in Table 6B.

TABLE 6B

| Sample | % Ether Extractables | % Extracted |
| --- | --- | --- |
| Control | 4.40 | |
| Acetone Extracted - Air Dried #1 | 1.62 | 63.2 |
| Acetone Extracted - Air Dried #2 | 1.59 | 63.9 |
| Acetone Extracted - Oven Dried | 1.55 | 64.8 |

The acetone extraction described above resulted in the removal of more than 63% of the wood extractives from the wood flakes. After the wood was oven-dried at 105° C. for 24 hours, the total extractables removed increased by only an additional 1%. This suggests that volatile organic compounds (VOCs) which easily dissolved and removed during the acetone extraction process were almost totally extracted from the flakes. Any residual wood extractives are expected to be less acetone-soluble, higher boiling components.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A composite wood product prepared by a method comprising:
   (a) extracting wood particulates with a solvent to remove a substantial portion of naturally-occurring volatile organic compounds and a substantial proportion of naturally-occurring pitch from the wood particulates to produce a liquid miscella comprising solvent, pitch and volatile organic compounds, said solvent being selected from the group consisting of methanol, ethanol and acetone;
   (b) separating the extracted wood particulates from the miscella;
   (c) adding a thermosetting binder to the extracted wood particulates in sufficient quantity to at least partially coat the particulates; and
   (d) subjecting the at least partially coated extracted wood particulates to heat and pressure to consolidate the particulates into a wood product.

2. The composite of claim 1, wherein the method further comprises:
   (a) reclaiming solvent from the miscella; and (b) recycling the reclaimed solvent for extracting additional wood particulates.

3. The composite of claim 1, wherein the step of subjecting to heat and pressure is substantially free of volatile organic compound emissions.

4. The composite of claim 1, wherein the step of subjecting to heat and pressure has substantially reduced emissions of volatile organic compounds that naturally occur in wood, as compared to emissions from subjecting to heat and pressure wood particulates with a naturally-occurring volatile organic compound content.

5. The composite of claim 1, wherein the unitary composite wood product is a board with at least about 25% increased wet cycle strength in a direction perpendicular to flat sides of the board.

6. The composite of claim 1, wherein the extracting removes from about 40 to about 90 wt % of the pitch from the wood particulates.

7. The composite of claim 1, wherein the extracting removes at least about 40% of the volatile organic compounds from the wood particulates.

8. The composite of claim 1, wherein the composite is selected from the group consisting of oriented strand board and particleboard.

9. A composite wood product prepared by a method comprising:
  (a) extracting wood particulates with a solvent to remove from about 40 to about 90 wt. % of the pitch from the wood particulates, and to remove at least about 40% of naturally-occurring volatile organic compounds from the wood particulates to produce a liquid miscella comprising solvent, extracted pitch, and extracted volatile organic compounds, said solvent being selected from the group consisting of methanol, ethanol and acetone;
  (b) separating the extracted wood particulates from the miscella;
  (c) adding a thermosetting resin binder to the extracted wood particulates in sufficient quantity to at least partially coat the particulates; and
  (d) subjecting the at least partially coated extracted wood particulates to heat and pressure to mold said particulates into a unitary composite wood product, while emitting substantially less volatile organic compounds that naturally occur in wood, as compared to amounts of volatile organic compounds emitted from subjecting wood particulates containing naturally-occurring volatile organic compound concentrations to the same heat and pressure conditions.

10. The composite wood product of claim 6 wherein said extraction of wood particulates with a solvent is carried out at a temperature of from about 10° C. to about 150° C. and at a pressure of from about 14.7 psi to about 50 psi.

11. The composite wood product of claim 10 wherein said extraction of wood particulates with a solvent is carried out at a temperature of from about 20° C. to about 130° C. and at a pressure of from about 15 psi to about 25 psi.

* * * * *

UNITED STATES PATENT AND TRADEMARK OFFICE
CERTIFICATE OF CORRECTION

PATENT NO.   : 6,075,076
DATED        : June 13, 2000
INVENTOR(S)  : J.B. Speaks et al.

It is certified that error appears in the above-identified patent and that said Letters Patent is hereby corrected as shown below:

<u>Column 1,</u>
Item [73] Assignee, "North American Paper Corporation" should read --North Pacific Paper Corporation--.

Signed and Sealed this

Seventeeth Day of July, 2001

*Attest:*

*Nicholas P. Godici*

NICHOLAS P. GODICI
*Attesting Officer*          *Acting Director of the United States Patent and Trademark Office*